United States Patent [19]

Eriksson

[11] Patent Number: 4,667,507

[45] Date of Patent: May 26, 1987

[54] METHOD AND A DEVICE FOR TESTING THE TIGHTNESS OF A COMBUSTION ENGINE

[76] Inventor: Ingemar Eriksson, Zinkvägen 10, S-860 20 Njurunda, Sweden

[21] Appl. No.: 800,117

[22] PCT Filed: Feb. 4, 1985

[86] PCT No.: PCT/SE85/00049

§ 371 Date: Oct. 19, 1985

§ 102(e) Date: Oct. 19, 1985

[87] PCT Pub. No.: WO85/03740

PCT Pub. Date: Aug. 29, 1985

[30] Foreign Application Priority Data

Feb. 21, 1984 [SE] Sweden ................................ 8400930

[51] Int. Cl.4 .............................................. G01M 3/00

[52] U.S. Cl. ..................................................... 73/49.7

[58] Field of Search ................. 73/118, 119 R, 40, 46, 73/47, 49.7, 40.5 R; 340/605

[56] References Cited

U.S. PATENT DOCUMENTS

| | | | |
|---|---|---|---|
| 2,328,289 | 8/1943 | Morgan et al. | 73/47 |
| 2,415,108 | 2/1947 | Newman | 73/40.5 R |
| 3,255,631 | 6/1966 | Franks | 73/45.8 |
| 3,266,297 | 8/1966 | Powers | 73/49.7 |
| 3,313,144 | 4/1967 | Johnson | 73/49.7 |
| 3,608,369 | 9/1971 | Wilkinson | 73/119 R |
| 3,650,147 | 3/1972 | Moyer | 73/49.7 |
| 4,059,985 | 11/1977 | Kelly | 73/46 |
| 4,102,178 | 7/1978 | Mercik, Jr. et al. | 73/49.7 |
| 4,235,100 | 11/1980 | Branchini | 73/49.7 |
| 4,494,402 | 1/1985 | Carney | 73/49.7 |

*Primary Examiner*—Stewart J. Levy
*Assistant Examiner*—Robert R. Raevis
*Attorney, Agent, or Firm*—Gifford, Groh, VanOphem, Sheridan, Sprinkel and Dolgorukov

[57] ABSTRACT

A method and a device for testing the tightness of an engine is based on measurement of the gas leakage from at least one combustion chamber of the engine into the cooling system by means of a measuring apparatus (5) which preferably is of pressure sensing type and which is connectable in that way that it communicates with the interior of the cooling system.

3 Claims, 2 Drawing Figures

METHOD AND A DEVICE FOR TESTING THE TIGHTNESS OF A COMBUSTION ENGINE

FIELD OF INVENTION AND PRIOR ART

This invention relates to a method and a device for testing the tightness of an engine which comprises at least one combustion chamber and a cooling system containing a fluid. The tightness mentioned here is the one between the combustion chamber of the engine and the cooling system.

A gas leakage between the combustion chamber of the engine and the cooling system can occur for instance as a result of defects of the cylinder head gasket or rifts and pores in the cylinder head or the engine block. Great leakages are naturally relatively easy to discover. A normal indication of such leakages is that the warm gases which are leaking into the cooling system cause such a heating of the cooling liquid that the cooling system no longer can hold the temperature of the cooling liquid near the motor at the regular low value. Another way of pointing out a leakage is to feed the cylinders with air pressure when the engine is not operating and thereby try to visually recognize indications of leakage. At small leakages as a consequence of relatively small defects of the cylinder head gasket or small rifts in the engine block, no testing procedure that gives a reliable leakage indication is existing at the time. However, it would be very desirable to be able to prove also if small leakages exist so that a repair can be done at an early stage; this will naturally reduce the risk of more grave damages as a result of overheating the engine or water leakage into the cylinder. In activities based on engine tune up of and application of supercharging to used engines it would be specially valuable to get reliable information about the tightness of the engine, because the mentioned proceedings often cause a higher operating pressure in the combustion chambers. Thus, a possible leakage would cause greater problems after these proceedings.

SUMMARY OF THE INVENTION

The object of the invention is to obtain a method and a device, which make it possible to attain an indication also of very small leakages of the kind mentioned above.

In accordance with the invention this object is obtained through the method and device characteristics which are described in the appendant claims..

BRIEF DESCRIPTION OF THE DRAWINGS

With reference to the appended drawing, below follows a specific description of an embodiment according to the invention. In the drawings.

DESCRIPTION OF THE PREFERRED EMBODIMENT

Figure 1:
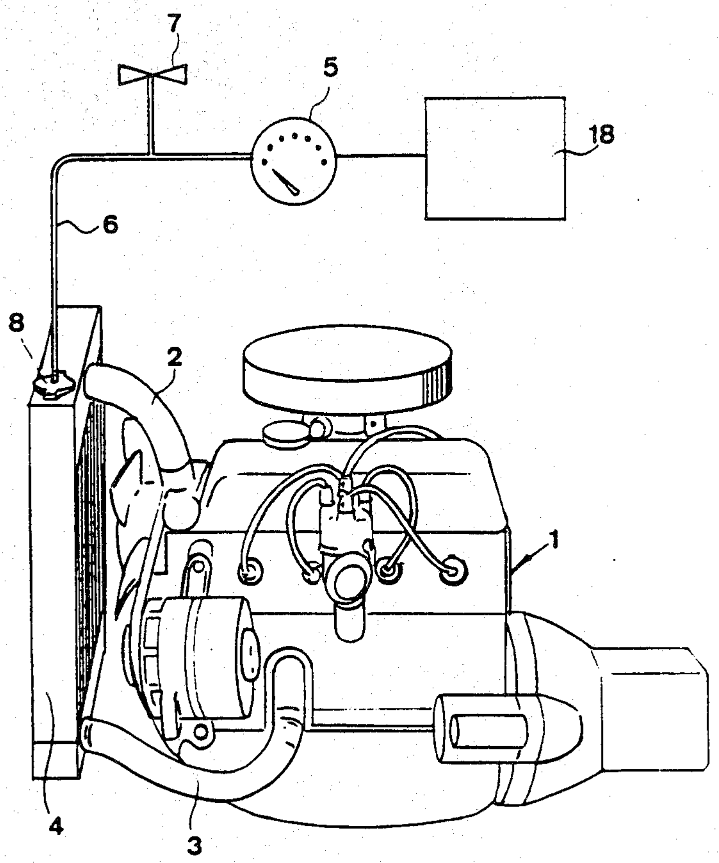
FIG. 1 is a schematic, perspective view of an engine, its cooling system and components which are used according to the invention.

In FIG. 1 a conventional combustion engine with an engine block 1 is illustrated. Inside the block there are cylinders with pistons which are movable in the cylinders under the influence of forces generated during the combustion of a fuel. Cooling liquid passages which form a part of a cooling system are arranged in the engine block. The cooling liquid passages in the engine block are through conduits 2 and 3 connected to a cooler or radiator 4. During the operation of the motor the cooling liquid will be pumped around in a cycle through the engine block 1, whereas a part of the liquid passes to the radiator 4 in order to be cooled down there and thereafter returned to the engine block 1.

The invention is based on the principle that the gas leakage from the combustion chamber into the cooling system is measured during the operation of the engine by means of a measuring apparatus 5, such as a manometer which senses pressure, and which is so connected that it communicates with the interior of the cooling system. Thus, the pressure increase which takes place in the cooling system as a result of a possible gas leakage can be detected by the measuring apparatus.

The manometer 5 is connectable to the cooling system by means of a conduit 6. The measuring apparatus 5 or in this case the conduit 6 is provided with a valve 7 which normally is in a closed position but also can be opened in order to attain a connection with the atmosphere.

Figure 2:
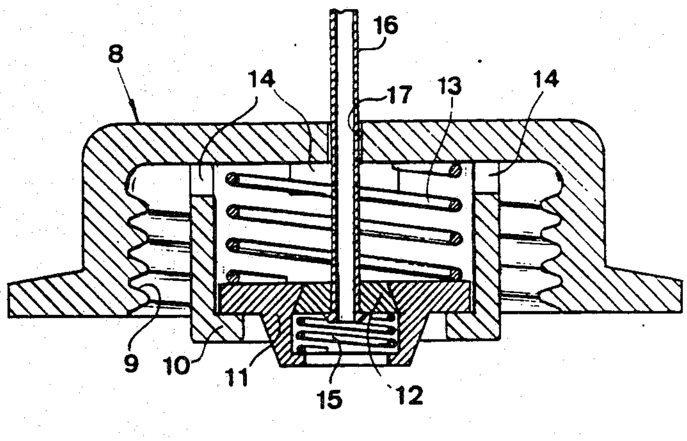
FIG. 2 is a cross section view illustrating a cap means comprised in the device according to the invention.

The conduit 6 is intended to communicate with the cooling system through a cap means 8, which is intended to substitute for the regular cap of the cooling system, in this example on its radiator 4, during the testing of the tightness. The cap means 8 (FIG. 2) is provided with a thread 9 for fastening. The cap means has a ring formed seat 10 which at the screwing of the cap onto the radiator is intended to fit up against a ring formed section of the mouth of the radiator in order to attain a sealing connection. The cap means 8 has in this example two movable valve means 11, 12, which are intended to open at great pressure differences between the interior of the cooling system and the surrounding atmosphere. The valve means 11 is formed like a disc valve and is influenced by a screw compression spring 13 into sealing engagement with a ring formed internal part of the section 10. When an overpressure of a certain size appears inside the cooling system the valve means 11 is opened against the force of the spring 13 so that consequently a communication between the interior of the cooling system and the surrounding is established by circumferential interruptions 14 in the cap means and longitudinal interruptions of the thread 9 of the cap means. The last mentioned interruptions are not shown in the drawings.

The second valve means 12 is in the example supported by the valve means 11. Also the valve means 12 is formed as a disc valve and is influenced by a compression spring 15 in order to achieve a sealing engagement with the valve means 11. When a negative pressure of a certain size relative to the surrounding atmosphere occurs in the interior of the cooling system as a result of cooling down of the cooling liquid, the valve means 12 can open against the force of the spring 15 in order to allow air flow into the cooling system. Thus, the earlier mentioned overpressure relationship between the interior of the cooling system and the surrounding occurs as a result of a heating-up of the cooling liquid.

In the example the conduit 6 comprises a section 16, which is rigid and projects freely through an opening 17 in the cap means and is attached to the valve means 12, so that the conduit section can move axially relative to the cap means and follow the valve means 12 in its possible movements. Naturally cap means 8, in order to enable an extensive use of the invention, should be provided in different variations so that testing of several vehicle types and brands can be carried out.

It is also possible to use a cap means completely without valve means but of course with the conduit 16 penetrating through the cap means, but in such case very great pressure differences between the interior of the cooling system and the surrounding atmosphere can occur unless valve means corresponding to the already described valve means 11 and 12 are not arranged at another place in the cooling system. In the case that the regular cooling cap of the vehicle only has a valve means intended to open under overpressure conditions in the cooling system and a valve means is arranged at another place in order to open at underpressure conditions, the conduit 6 can of course be connected to said means opening at overpressure.

In carrying out testing of the tightness the following steps are preferably applied after the connection of the components 5-8:

(a) At first the engine is run, i.e. during fuel combustion in the combustion chambers of the engine, until the normal operating temperature is achieved.

(b) Subsequently the overpressure in the cooling system, which overpressure is resulting from the heating-up of the cooling liquid, is eliminated by opening of the valve 7.

(c) Thereafter the valve 7 is closed.

(d) After that the engine is run. It is preferred that the engine is run under a very high load. Here high load not only means a high number of revolutions but also that a maximum of operating pressure occurs in the combustion chambers of the engine. For instance the engine can be run with full opening of the throttle but with such a resistance that the number of revolutions is in the region of the maximum of the torque output of the engine. The engine can thereat be run in a device which is capable of imparting braking forces to the engine or under other similar artificial circumstances. Naturally the engine can also be run during regular vehicle movement. In the latter case it is suitable for carrying out the testing that the valve 7 and the measuring apparatus 5 are located inside the driving compartment of the vehicle.

(e) During the running of the engine described under section d the relation pressure/time is registered by means of the measuring apparatus 5. If a leakage exists between one or some of the combustion chambers in the engine and the cooling system, the running of the engine under said high load will cause a maximum of leakage. This leakage in turn will cause a pressure increase in the cooling system also if the higher heat flow to the cooling liquid caused by the leakage can be dissipated by means of the radiator 4 without any increase of the cooling liquid temperature to unallowable levels.

(f) Thereafter the registered relation pressure/time can possibly be compared with reference data which earlier have been determined for comparable engines, so that information about how serious the leakage is is obtained. Depending on the circumstances in the particular case a relatively insignificant leakage sometimes can be left unattended while in other cases a repair must be done immediately.

Although the measuring apparatus 5 in its simplest embodiment could have the character of a simple manometer with a needle index or display panel for direct manual reading, it is naturally within the scope of the invention to form the measuring apparatus 5 as a transducer which transforms the registered pressure values to preferably electrical signals, which are given to a signal processing device 18 for storing and/or presentation of measured data in a manner in itself well known within the techniques of measurement.

Naturally the device can be modified in several ways within the scope of the idea of the invention. Above it has been described how the cap means 8 is formed for application at the opening of a radiator 4. In cooling systems of a so called "closed" embodiment, i.e. with a separate expansion vessel, which communicates with the cooling system through liquid conduits and in which cooling liquid normally is refilled, the cap means 8 can just as well be intended to be attached upon the opening of such an expansion vessel. Above it has also been described how the pressure values are used as a criterion of the gas leakage into the cooling system. An alternative possibility would be to form the measuring apparatus 5 so that it would measure the volume of the gas flowing out of the cooling system through the conduit 6 during the operation of the engine. The gas volume per unit of time is then an equally pertinent measure of the gas leakage as the pressure values described above, although from the practical point of view it probably will be preferred to work with a measuring apparatus of the pressure sensitive type. It should also be mentioned that the valve means (e.g. the means 11 in the cap means 8) opening at overpressure in the cooling system should be arranged in order to open at such overpressures which are lying clearly in excess of the generally relatively small overpressures which normally occur during the measuring as a result of gas leakage.

I claim:

1. A method for testing the sealing integrity of an engine having a combustion chamber and a fluid coolant system, wherein leakage of gas from the combustion chamber to the coolant system provides a measurable parameter, said method comprising the steps of:

(a) first running of the engine until a normal operating temperature is achieved;

(b) venting pressure inside the coolant system to atmospheric pressure by opening a valve fluidly connected between the coolant system and the atmosphere;

(c) closing the valve;

(d) second running of the engine for a predetermined test period; and (e) simultaneously with said second running step measuring the pressure within the coolant system.

2. The method as defined in claim 1 wherein said second running the engine (step d) comprises running the engine under relatively high load to maximize the magnitude of leakage.

3. The method as defined in claim 1 and comprising the further step of comparing said measurements (step e) with reference data determined previously for comparable engines.

* * * * *